Oct. 22, 1940.  C. B. STRAUCH  2,218,690

PNEUMATIC PROTECTOR FOR AUTOMOBILES

Filed March 9, 1939  2 Sheets-Sheet 1

INVENTOR.

Clauss Burkart Strauch

Oct. 22, 1940.   C. B. STRAUCH   2,218,690
PNEUMATIC PROTECTOR FOR AUTOMOBILES
Filed March 9, 1939   2 Sheets-Sheet 2
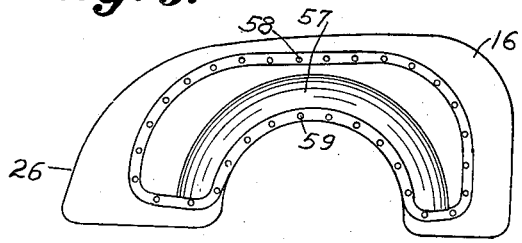
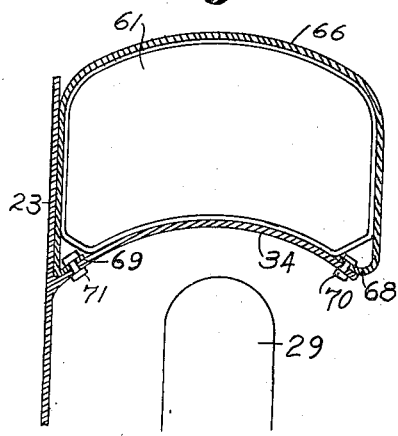
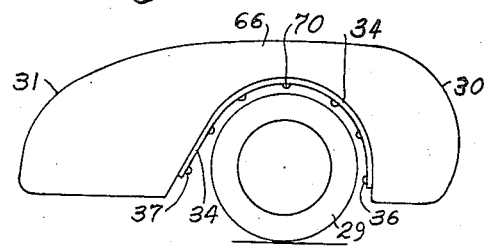
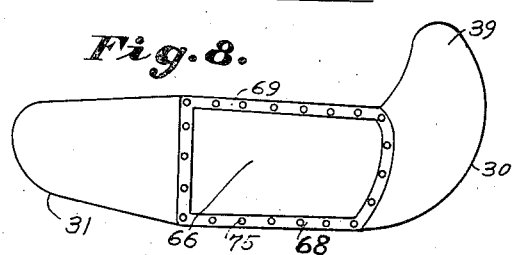
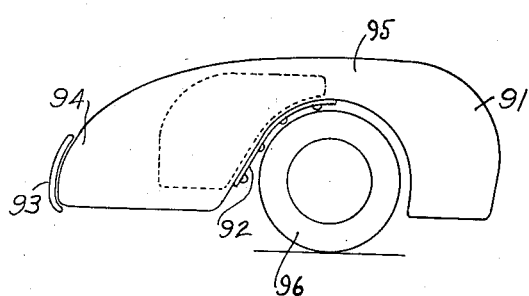
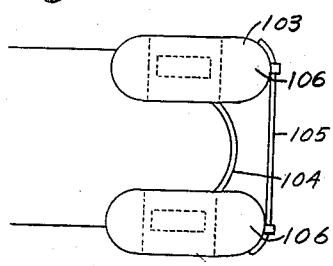
INVENTOR.
Clauss Burkart Strauch Patented Oct. 22, 1940

2,218,690

UNITED STATES PATENT OFFICE 2,218,690

PNEUMATIC PROTECTOR FOR AUTOMOBILES

Clauss Burkart Strauch, Milwaukee, Wis.

Application March 9, 1939, Serial No. 260,672

3 Claims. (Cl. 280—152)

This invention relates to improvements in pneumatic protectors of automobiles or means to render automobiles safer and more particularly to novel constructions of automobiles adapted to lessen in automobile accidents the injury to objects including the car itself and to persons including outside persons as well as occupants of the car.

Automobiles have become every year faster and more powerful, more economical and better looking, yet only few improvements, such as the use of shatterproof glass, have been made to render driving safer. Every car is softly cushioned against the street by springs, shock absorbers and pneumatic tires, or oversized low pressure inflated balloon tires. On its four sides however, the present day automobile is still of unyielding, metallic hard impact as much as any early model; no construction taking count of the greater power, the increased traffic and speed on smooth roads. In consequence, every day hundreds of people die, and thousands are injured in automobile accidents.

The bumpers, even of the latest automobiles, are made of steel or solid rubber showing feeble spring action only when colliding with a resistant object, and not yielding to easier impacts such as effected by the soft tissues of living persons. These bumpers do not show any spring action when the car is hit in any other direction outside of the longitudinal axis; furthermore, they generally are provided with protruding ends acting as a thorn or hook and frequently leading to entanglements and accidents.

The fenders of the present day automobiles are constructed merely for decorative purposes, for the flow of air and against dirt thrown from the wheels. They consist of thin, decorated, formed metal sheets, easily marred and crushed by any impact, leading to repeated and costly repairs.

The primary object of my invention is to construct automobiles provided with yielding, soft, elastic and resilient protectors which will absorb shocks on all four corners and sides of the automobile and will cushion all surfaces liable to be involved in accidents, protecting car and occupants as well as outside persons or objects, colliding with the car.

Another object of the present invention is to construct fenders and other parts of the automobile body resilient, eliminating repairs.

With the foregoing objects outlined and with other objects in view which will appear as the description proceeds, the invention consists in the novel features hereinafter described in details, illustrated in the accompanying drawings, and more particularly pointed out in the appended claims.

I attain the objects described before by the use of pneumatic protectors illustrated in the accompanying drawings.

In the drawings:

Figure 5 is a side elevation view of the detached left rear fender casing; seen from the inner side.

Figure 6 illustrates a vertical sectional view in line 6—6 of Figure 4, showing the right front fender including supporting metal parts and the outline of the wheel.

Figure 7 is a side elevation of the right front fender and wheel.

Figure 8 shows the left front fender detached and seen from below.

Figure 9 is a modification of Figure 7.

Figure 10 is a plan view of modifications in the shape of the fenders illustrated in Figure 1, showing in broken lines the outlines of the wheels, the wheel space, and the supporting surfaces.

Figure 1:
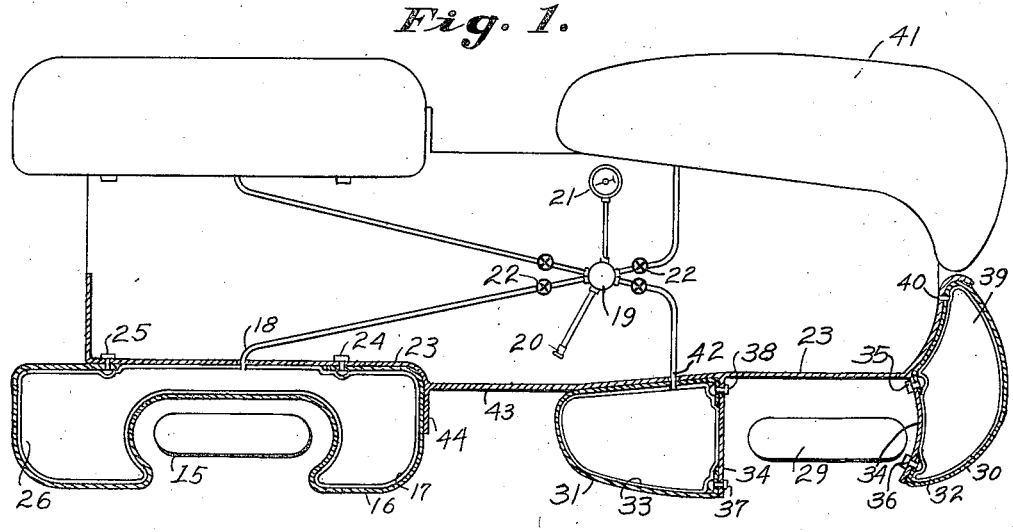
Figure 1 is in its lower half a horizontal sectional view on line 1—1 of Figure 4, representing the right half of an automobile, applied with pneumatic protectors according to my invention, showing the protectors, the air ducts, the supporting metal parts, and the outline of the wheels, omitting motor and other details; the upper half is a plan view, showing the left side protectors.

In Figure 1, 15 is the right rear wheel of an automobile which is surrounded on three sides by a pneumatic fender consisting of a hollow flexible outer casing, 16, and an elastic inner bladder 17, both corresponding approximately in structure and material to pneumatic automobile tires, consisting of an outer tire casing and an inner tube. The inner tube or bladder 17, is filled with gas or preferably air under pressure through the inlet tube 18, which may optionally lead to a hollow center 19, serving for all or a plurality of the pneumatic protectors contained in the automobile, and constructed with a common intake valve 20, a pressure indicating meter 21, and individual shut-off valves 22. The outer casing 16 opens towards the body 23, of the car and is fastened by the bolts 24, and 25 to the body or frame of the car. The rear pole 26, is protruding, freely compressible, over the body of the car.

The front wheel 29 is illustrated flanked on two sides only, by the outer casing 30 and 31 carrying the innertubes 32 and 33. The outer casings 30 and 31 are open towards a curved support 34, part of the automobile body or frame and are fastened to the same by the screws 35, 36, 37 and 38. The front pole 39, may optionally be fastened to the frame by the bolt 40, which may be elastic involving the use of springs or it may be united by a rigid or elastic link to the left front protector 41. The pneumatic casing and tubes 30, 32 and 31, 33 are the parts of one cavity, joining over the support arch 34 and forming parts of a body closely related in its outer lines to the fender of a 1939 automobile, as further illustrated in the other figures. 42 represents the air inlet for the right front fender.

The space 43, between the inner poles of the fenders is the part of the automobile body or frame where the lower end of the door or doors is located. The drawings illustrate well how the poles of the protectors safeguard the doors, against shocks in most lateral directions. 44 is an optional support bracket for the rear fender.

Figure 2:
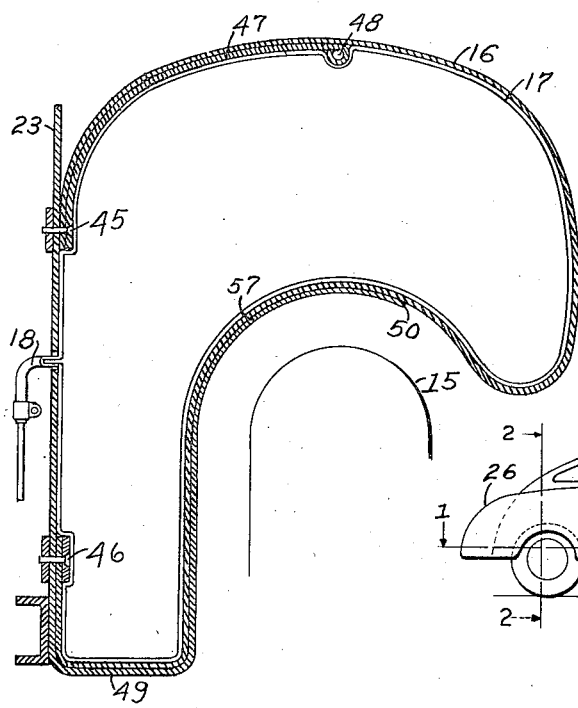
Figure 2 is a vertical sectional view in line 2—2 of Figure 4, showing the right rear fender including supporting metal parts and the surface of the wheel.

In Figure 2, the details of structure and suspension of the rear protectors are shown. The outer casing 16, carrying the inner bladder 17, opens towards the frame or body 23 and is screwed or bolted to the same in 45 and 46 corresponding in effect to 24 and 25 of Figure 1. The juncture 45 carries an optional rigid shell 47, ending in the rounding brim 48; curved according to the surface of the outer casing; and serving in any desired width as an optional support of the fender. 49 is in purpose a similar shell, constructed of metal and extending from the frame 23, to support the lower surface of the casing 16. Its end 50, may be united with the casing 16. The lateral end of the fender may optionally protrude as shown in the drawings, to act as a resilient buffer.

The supports 47 and 49, are not essential in all constructions according to my invention, since the pneumatic fender as described will well hold in place when sufficiently inflated and well anchored, and especially when extending over the rear end of the body towards the center line. The support 49, is not shown in Figure 1. The supports when included in the construction, serve not only to hold the fenders in their position but also act as counter bearings towards shocks acting upon the fender.

Figure 3:
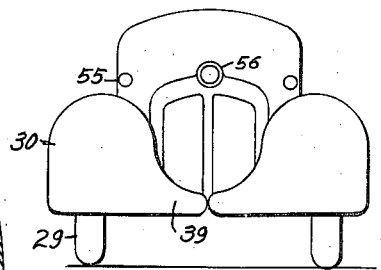
Figure 3 is a front elevation.

The front elevation view in Figure 3, shows the preferred position of the headlamps 55 and 56 restricting the protruding and resilient fenders to protecting and shock absorbing purposes only. Without leaving my invention, the lights may be placed on the surface of the protectors or into shallow or deep cupshaped cavities spared on the front or side of the pneumatic fenders, or on brackets extending laterally from the body or in other ways. I prefer to support the headlamps on elastic and resilient brackets, less easily damaged in collisions. While Figure 3 illustrates one central headlight, flanked by two smaller lamps, any other arrangement such as two larger headlights or more is included in the description related above.

Figure 4:
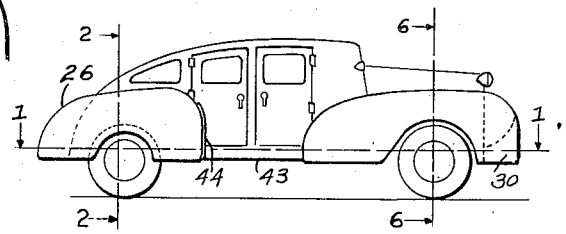
Figure 4 a side elevation of an automobile according to my invention.

The interrupted lines in Figure 4 represent projections of the body and of the front bumper. The drawings are a self evident description, showing how the pneumatic fenders, more properly to be designated fender bumpers, surround the automobile like inflated cushions, protecting the same from all sides, without changing materially the streamlined appearance of the modern car.

Figure 5 shows the left rear fender seen from the inside. Since the body of a modern automobile and also of an automobile constructed according to my invention is built symmetrical on the right and the left side of the car, details in my drawings are assumed to be equal in construction on either side, and identical numerals are used to designate the parts of both sides, although in fact both sides differ as an object and its image reflected by a miror. 57 is the curved part of the casing touching the support 49, 50 of Figure 2; 58 and 59 are perforations for the bolts 45 and 46 of Figure 2.

The methods of fastening the flexible casing to the body or frame of the car, shown in the figures are merely illustrative and should not limit my invention to the constructions shown. I may use any construction known in the art of securing rubber to metal or more particularly rubber tires to wheels.

In Figure 6, 66 is the part of the outer casing which connects the outer casing 30 of the front pole with the casing 31 of the rear pole, of Figure 1, carrying the innertube 32 and 33, and arching over the support 34 a part of the car body or frame 23. The open side of the casing 66 is fastened to 34, by screwing the lips 68 and 69 to the support 34 by means of the screws 70 and 71 corresponding in effect to the joints 35, 36, 37 and 38 of Figure 1.

The casing 31, 66, 30 of Figure 7 represents preferably one unit carried by the arch 34 surrounding the wheel 29, as described before. Figure 8 shows the casing 31, 66, 30 seen from below showing the holes 75 for the screws.

The Figures 1 to 8 shows different views and details of one car applied with pneumatic fender-bumpers according to my invention. These drawings merely illustrate one form out of many, in which my invention can be constructed and are not intended as limiting the present invention to this shape or form. I believe that the principle of pneumatic protectors for automobiles against shocks affecting the car from any side or angle can be applied in many forms, chiefly depending upon the style and outline desired in future models, but not basically changing the principle underlying my invention. In Figures 9 and 10 only a few of such modifications included in my invention are illustrated.

The rigid support 34, for instance, of Figures 6 and 7, limits somewhat the resiliency of the pneumatic fender against lateral shocks, centering near the wheel. The rubber may therefore bulge over the rigid support, similar as shown in Figure 2, for the rear fender bumper.

Figure 9 shows a pneumatic protector similar to Figure 7. It has however, a freely compressible, non suspended front lobe 91, which is supported only in its posterior center by the semi-arch 92 and an optional rigid bearing 93 supporting the rear pole 94. The broken lines indicate an additional optional juncture to the car body or frame. Any shocks affecting the bumper from the front, will kink the pole approximately in the plane 95, throwing it against the wheel tire 96, absorbing part of the shock. The rear fender may be constructed similarly.

Protectors, according to my invention, may be constructed in connection with metal parts, rigid or springs, in many forms. In Fig. 10, 103 is a pneumatic left front protector, overlapping the front end 104 of the car. A bumper 105, consisting of metal, rigid or thin and elastic, a steel blade or a spring, of rubber or other material, is attached to the front poles 106 of the left protector 103 and the corresponding right protector, forming a resilient well cushioned bridge across the front of the car.

As materials to construct protectors according to my invention, I prefer to select rubber for the thinner elastic inside bladder pressure inflated through a valve, and rubber and fibrous materials, such as cotton, for the heavier flexible outside casing; constructing in material and thickness the protectors essentially like pneumatic tires which serve a related purpose and also consist of an open outer casing inflated by means of a closed inside tube differing only through their circular shape and their constant friction against abrasive roads.

Protectors, according to my invention, are not subject to continued abrasion and constant wear and tear of the elastic qualities. They may be subject, however, to heavy shocks in collisions and accidents requiring a pressure resisting casing containing preferably strong fibres. It is part of my invention to use optionally for enforcement of the outer casing flexible metal wires preferably made of steel and imbedded on the surface or within the wall of the casing. I found that even a casing consisting solely of wires in form of a dense netting will be suitable for the outer casings, with or without a suitable covering, and supplemented by a rubber inner bladder, which later describes a closed inflatable rubber bag, supplied with an air-valve and corresponding to the customary automobile innertube but distinguished by non-circular shape.

The air pressure with which the inner bladders will be inflated is dependent greatly on the size of the protectors, of the weight of the car, of their suspension, of the pressure resistance of the outer casings and other factors. Generally spoken, the pressure is to be maintained and regulated similar as in the tires of automobiles, mostly however, requiring less. Well inflated, the protectors should represent firm, not flabby, resilient cushions, requiring an effort to be indented, but showing no strain on the outer casing, the inner bladder, being supported on all sides, depending fully on the resistance of the outer casing.

Each protector may be inflated through a special valve and kept inflated by a pressure individually adapted to its shape and purpose. I prefer however, to inflate all protectors from a common orifice, reading the pressure from a common meter, but being enabled to test each protector separately and to shut it off in case of defects by separate valves, substantially as diagrammatically described in Fig. 1.

It is an essential part of my invention to optionally construct the air ducts shown in Fig. 1, or shorter or similar ones, of such diameter that all protectors form in fact one system of equal pressure which is flowing easily from one to the other when subjected to shocks. In an automobile constructed with such freely communicating pneumatic protectors, a shock affecting one protector will be transmitted and born by every one or a plurality of the compressed air spaces and pneumatic casings, greatly diminishing the injurious effects of the shocks and preventing damage.

The surface of my pneumatic protectors does not need to show the deep corrugations customary in tires but may be smooth or embossed with various patterns or may be coated by colored flexible lacquers, varnishes and other coatings. Coatings containing metal powders or the admixture of powdered aluminum or bronze to the rubber of the casing are preferably employed by me.

Pneumatic protectors for larger cars may be quite substantial in dimensions and difficult to manufacture in one piece. I overcome this technical difficulty by forming the protectors in two halves or in several pieces, mounting them in sections or preferably uniting them by cementing or riveting the pieces together into one casing, shaped as desired. I also find it practical to build the protectors up over wooden forms, layer after layer, using rubber, cotton, wire and other materials and removing the mold piecewise.

As shown in Fig. 1, the doors of the car and the running boards are well protected, being located between the bulges of the pneumatic front and rear fenders. My invention includes, however, to construct the running boards as shock-bearing structures, either by forming them rigid and anchoring them to the adjoining poles of the fenders; similar in effect as shown for the front bumper in Fig. 10, or by forming them in part or full as pneumatic protectors each consisting of a casing and an innertube, as described.

Shockproof automobiles according to my invention, consisting essentially of a steel body surrounded and cushioned in all directions against collisions by pneumatic protectors constructed like inflated tires will greatly diminish the dangers of accidents; they are expected to carry a lower insurance; and they will eliminate expensive repairs to fenders, bumpers and body. These advantages will make the pneumatic protectors cheaper in final cost than the present fenders and bumpers. In addition, they are expected to save countless lives and injuries by diminishing the damage done in automobile accidents.

While I have disclosed what I now consider to be some preferred embodiments of the invention in such manner that they may be readily understood, it is manifest that changes may be made in the details disclosed without departing from the spirit of the invention as expressed in the claims.

What I claim and desire to secure by Letters Patent is:

1. A yielding fender construction for automobiles in combination with an automobile body having wheels and having metal side portions and having a curved metal portion over each wheel thereof, said yielding fender construction comprising an outer flexible, relatively inextensible casing cut away adjacent at least a portion of the metal parts of said automobile and secured thereto and bearing against and supported from the side metal parts of the automobile and the said curved metal part, and an elastic inflated inner tube located within said outer casing and conforming thereto, at least a portion of the metal parts of said automobile forming an extension of the casing and together with said casing completely enclosing said inner tube.

2. A yielding fender construction for automobiles in combination with an automobile body having wheels and having metal side portions and having a curved metal portion over each wheel thereof, said yielding fender construction comprising an outer flexible, relatively inextensible casing formed of rubber with embedded nonextensible strands and cut away adjacent at least a portion of the metal parts of said automobile and secured thereto and bearing against and supported from the side metal parts of the automobile and the said curved metal part, and an elastic inflated inner tube located within said outer casing and conforming thereto, at least a portion of the metal parts of said automobile forming an extension of the casing and together with said casing completely enclosing said inner tube.

3. A yielding fender construction for automobiles in combination with an automobile body having wheels and having metal side portions and having a curved metal portion over each wheel thereof, said yielding fender construction comprising an outer flexible, relatively inextensible casing formed of rubber with embedded nonextensible strands and cut away adjacent at least a portion of the metal parts of said automobile and secured thereto and bearing against and supported from the side metal parts of the automobile and the said curved metal part, and an elastic inflated inner tube located within said outer casing and conforming thereto, at least a portion of the metal parts of said automobile forming an extension of the casing and together with said casing completely enclosing said inner tube, said metal side portions and said curved metal portions assisting in maintaining the shape of the fenders and preventing ballooning thereof.

CLAUSS BURKART STRAUCH.